US012754152B2

(12) United States Patent
Shin et al.

(10) Patent No.: US 12,754,152 B2
(45) Date of Patent: Oct. 6, 2026

(54) APPARATUS FOR ANALYZING COMPOSITION AND METHOD THEREOF

(71) Applicants: Hyundai Motor Company, Seoul (KR); Kia Corporation, Seoul (KR); 3I Solution Inc., Suwon (KR)

(72) Inventors: Jun Young Shin, Seoul (KR); Ho Kwon Na, Seoul (KR); Kyung Min Park, Seoul (KR); Jung Hyeon Eo, Seoul (KR)

(73) Assignees: Hyundai Motor Company, Seoul (KR); Kia Corporation, Seoul (KR); 3I Solution Inc., Suwon (KR)

( * ) Notice: Subject to any disclaimer, the term of this patent is extended or adjusted under 35 U.S.C. 154(b) by 146 days.

(21) Appl. No.: 18/926,640

(22) Filed: Oct. 25, 2024

(65) Prior Publication Data

US 2025/0137948 A1 May 1, 2025

(30) Foreign Application Priority Data

Oct. 26, 2023 (KR) ........................ 10-2023-0145032

(51) Int. Cl.
*G01N 23/00* (2006.01)
*G01N 23/222* (2006.01)

(52) U.S. Cl.
CPC ......... *G01N 23/222* (2013.01); *G01N 23/005* (2013.01); *G01N 2223/0745* (2013.01); *G01N 2223/1013* (2013.01); *G01N 2223/106* (2013.01); *G01N 2223/304* (2013.01); *G01N 2223/306* (2013.01); *G01N 2223/345* (2013.01); *G01N 2223/423* (2013.01); *G01N 2223/501* (2013.01); *G01N 2223/507* (2013.01)

(58) Field of Classification Search
CPC ............... G01N 23/005; G01N 23/222; G01N 2223/0745; G01N 2223/1013; G01N 2223/106; G01N 2223/304; G01N 2223/306; G01N 2223/345; G01N 2223/423; G01N 2223/501; G01N 2223/507
See application file for complete search history.

(56) References Cited

U.S. PATENT DOCUMENTS

2020/0300791 A1* 9/2020 Ivan ........................ G01T 3/001

* cited by examiner

*Primary Examiner* — Mark R Gaworecki
(74) *Attorney, Agent, or Firm* — Fox Rothschild LLP

(57) ABSTRACT

A composition analysis device includes a first detection sensor that identifies gamma rays, a second detection sensor that identifies the gamma rays, and a detection controller. The first detection sensor and the second detection sensor may detect gamma rays emitted by a target object, and transmit, to the detection controller, first gamma-ray information and second gamma-ray information respectively. The detection controller may transmit the first gamma-ray information, to an information analysis device when the detection control identifies that the first gamma-ray information has been transmitted, and transmit the second gamma-ray information, to the information analysis device when the detection control does not identify that the first gamma-ray information has been transmitted and the detection control identifies that the second gamma-ray information has been transmitted. The information analysis device may analyze a component of the target object, a content of the target object, or any combination thereof.

20 Claims, 7 Drawing Sheets

APPARATUS FOR ANALYZING COMPOSITION AND METHOD THEREOF

CROSS-REFERENCE TO RELATED APPLICATION

This application claims under 35 U.S.C. § 119 (a) the benefit of Korean Patent Application No. 10-2023-0145032, filed in the Korean Intellectual Property Office on Oct. 26, 2023, the entire contents of which are incorporated herein by reference.

BACKGROUND

Technical Field

The present disclosure relates to a composition analysis device and method, and more particularly to a technique for improving the operational stability of a composition analysis device even when some components of the composition analysis device are not operational.

Background

Among non-destructive analytical techniques, neutron composition analysis technique may precisely identify components and contents without altering the physical and chemical properties of a sample. Compared to other non-destructive analytical techniques, the neutron composition analysis technique requires less time to analyze components and analyzes a large number of samples simultaneously.

When neutrons are irradiated into a sample, gamma rays may be emitted as a result of the interaction of the neutrons with the sample. Because the spectrum of gamma rays emitted from a sample varies depending on the composition of the sample, a composition analysis device may identify the component and content of the sample by analyzing the spectrum of the acquired gamma rays.

Because neutron composition analysis devices are used in environments with a lot of dust, vibration, and moisture due to the nature of the industry, research is being conducted to improve the operational stability of neutron composition analysis devices.

SUMMARY

The present disclosure has been made to solve the above-mentioned problems occurring in the prior art while advantages achieved by the prior art are maintained intact.

An aspect of the present disclosure provides a composition analysis device and method for ensuring operational stability by detecting gamma rays through a plurality of detection sensors connected in parallel.

An aspect of the present disclosure provides a composition analysis device and method for ensuring operational stability when some of components of the composition analysis device for detecting gamma rays fail.

An aspect of the present disclosure provides a composition analysis device and method for improving the convenience of device maintenance by notifying the user of the failure of some of the components for detecting gamma rays when some of the components for detecting gamma rays fail.

An aspect of the present disclosure provides a composition analysis device and method for continuously performing composition analysis through other detection results, by obtaining a plurality of detection results from a plurality of detection sensors connected in parallel, even when some of the plurality of detection results is not obtained.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a composition analysis device includes a first detection sensor that identifies gamma rays, a second detection sensor that identifies the gamma rays, and a detection controller.

According to an embodiment, the first detection sensor and the second detection sensor may detect gamma rays emitted by a target object from irradiation of neutrons to the target object, and transmit, to the detection controller, first gamma-ray information about a gamma ray spectrum detected by the first detection sensor and second gamma-ray information about a gamma ray spectrum detected by the second detection sensor respectively. The detection controller may transmit the first gamma-ray information to an information analysis device when the detection controller identifies that the first gamma-ray information has been transmitted from the first detection sensor to the detection controller, and transmit the second gamma-ray information to the information analysis device when the detection controller does not identify that the first gamma-ray information has been transmitted from the first detection sensor to the detection controller and the detection controller identifies that the second gamma-ray information has been transmitted from the second detection sensor to the detection controller. The information analysis device may analyze a component of the target object, a content of the target object, or any combination thereof based on the first gamma-ray information or the second gamma-ray information.

According to an embodiment, the detection controller may transmit a signal indicating a failure of the composition analysis device, to the information analysis device when the detection controller does not identify that the first gamma-ray information has been transmitted from the first detection sensor to the detection controller and the detection controller does not identify that the second gamma-ray information has been transmitted from the second detection sensor to the detection controller.

According to an embodiment, the information analysis device may provide the component of the analyzed target object, the content of the analyzed target object, or any combination thereof to a user when the first gamma-ray information or the second gamma-ray information is received, and provide a notification indicating the failure of the composition analysis device to the user when a signal indicating the failure is received.

According to an embodiment, the detection controller may transmit the first gamma-ray information, not the second gamma-ray information, to the information analysis device when the detection controller identifies that the first gamma-ray information is transmitted from the first detection sensor to the detection controller, and that the second gamma-ray information is transmitted from the second detection sensor to the detection controller.

According to an embodiment, the first gamma-ray information may be transmitted to the detection controller from the first detection sensor via a first signal transmission line and converted into a digital signal through the detection controller. The second gamma-ray information may be transmitted to the detection controller from the second detection sensor via a second signal transmission line different from the first signal transmission line and converted into a digital signal through the detection controller.

According to an embodiment, the first gamma-ray information and the second gamma-ray information may be transmitted from the first detection sensor and the second detection sensor to the detection controller via a shielding cable. The shielding cable may include a cable core that transmits the first gamma-ray information and the second gamma-ray information, and a shielding layer that surrounds the cable core to reduce noise caused from outside the shielding cable.

According to an embodiment, the first gamma-ray information may be transmitted from the detection controller to the information analysis device via a first optical fiber. The second gamma-ray information may be transmitted from the detection controller to the information analysis device via a second optical fiber different from the first optical fiber. The first optical fiber and the second optical fiber may be included in a dual-optical fiber cable.

According to an embodiment, the detection controller may include a first receiver that receives the first gamma-ray information, a first controller that receives the first gamma-ray information from the first receiver, a second receiver that receives the second gamma-ray information, the second receiver being different from the first receiver, a second controller that receives the second gamma-ray information from the second receiver, the second controller being different from the first controller, and a transmitter that transmits the first gamma-ray information, the second gamma-ray information, or a signal indicating the failure to the information analysis device.

According to an embodiment, the first gamma-ray information and the second gamma-ray information may respectively include an intensity of one of the first gamma ray and the second gamma ray, a wavelength of one of the first gamma ray and the second gamma ray, or any combination thereof.

According to an embodiment, the composition analysis device may further include a third detection sensor that identifies the gamma rays. The third detection sensor may detect gamma rays emitted from the target object, and transmit third gamma-ray information about a gamma ray spectrum detected by the third detection sensor to the detection controller. The detection controller may transmit the third gamma-ray information to the information analysis device when the detection controller does not identify that the first gamma-ray information has been transmitted from the first detection sensor to the detection controller the detection controller does not identify that the second gamma-ray information has been transmitted from the second detection sensor to the detection controller, and the detection controller identifies that the third gamma-ray information has been transmitted from the third detection sensor to the detection controller. The information analysis device may analyze a component of the target object, a content of the target object, or any combination thereof based on the third gamma-ray information.

According to an aspect of the present disclosure, a composition analysis method includes detecting, by a first detection sensor and a second detection sensor, gamma rays emitted from a target object from irradiation of neutrons to the target object, transmitting, by the first detection sensor and the second detection sensor, to a detection controller, first gamma-ray information about a gamma ray spectrum detected by the first detection sensor and second gamma-ray information about a gamma ray spectrum detected by the second detection sensor respectively, transmitting, by the detection controller, the first gamma-ray information to an information analysis device when the detection controller identifies that the first gamma-ray information has been transmitted from the first detection sensor to the detection controller, transmitting, by the detection controller, the second gamma-ray information to the information analysis device when the detection controller does not identify that the first gamma-ray information has been transmitted from the first detection sensor to the detection controller and the detection controller identifies that the second gamma-ray information has been transmitted from the second detection sensor to the detection controller, and analyzing, by the information analysis device, a component of the target object, a content of the target object, or any combination thereof based on the first gamma-ray information or the second gamma-ray information.

According to an embodiment, the composition analysis method may further include transmitting, by the detection controller, a signal indicating a failure of the composition analysis device, to the information analysis device when the detection controller does not identify that the first gamma-ray information has been transmitted from the first detection sensor to the detection controller and the detection controller does not identify that the second gamma-ray information has been transmitted from the second detection sensor to the detection controller.

According to an embodiment, the composition analysis method may further include providing, by the information analysis device, the component of the analyzed target object, the content of the analyzed target object, or any combination thereof to a user when the first gamma-ray information or the second gamma-ray information is received, and providing, by the information analysis device, a notification indicating the failure of the composition analysis device to the user when the signal indicating the failure is received.

According to an embodiment, the composition analysis method may further include transmitting, by the detection controller, the first gamma-ray information, not the second gamma-ray information, to the information analysis device when the detection controller identifies that the first gamma-ray information is transmitted from the first detection sensor to the detection controller, and that the second gamma-ray information is transmitted from the second detection sensor to the detection controller.

According to an embodiment, the transmitting, by the first detection sensor and the second detection sensor, to the detection controller, the first gamma-ray information about the gamma ray spectrum detected by the first detection sensor and the second gamma-ray information about the gamma ray spectrum detected by the second detection sensor respectively may include transmitting, by the first detection sensor, the first gamma-ray information from the first detection sensor to the detection controller via a first signal transmission line, transmitting, by the second detection sensor, the second gamma-ray information from the second detection sensor to the detection controller via a second signal transmission line different from the first signal transmission line; and converting the first gamma-ray information and the second gamma-ray information into a digital signal respectively through the detection controller.

According to an embodiment, the transmitting, by the first detection sensor and the second detection sensor, to the detection controller, the first gamma-ray information about the gamma ray spectrum detected by the first detection sensor and the second gamma-ray information about the gamma ray spectrum detected by the second detection sensor respectively may include transmitting the first gamma-ray information and the second gamma-ray information via a cable core included in a shielding cable, and reducing noise caused from outside the shielding cable via a shielding layer included in the shielding cable, the shielding layer surrounding the cable core.

According to an embodiment, the transmitting, by the detection controller, the second gamma-ray information to the information analysis device when the detection controller does not identify that the first gamma-ray information has been transmitted from the first detection sensor to the detection controller and the detection controller identifies that the second gamma-ray information has been transmitted from the second detection sensor to the detection controller may include transmitting the first gamma-ray information from the detection controller to the information analysis device via a first optical fiber, and transmitting the second gamma-ray information from the detection controller to the information analysis device via a second optical fiber different from the first optical fiber. The first optical fiber and the second optical fiber may be included in a dual-optical fiber cable.

According to an embodiment, the composition analysis method may further include receiving, by a first receiver, the first gamma-ray information, the first receiver being included in the detection controller, receiving, by a first controller, the first gamma-ray information from the first receiver, the first controller being included in the detection controller, receiving, by a second receiver, the second gamma-ray information, the second receiver being included in the detection controller and different from the first receiver, receiving, by a second controller, the second gamma-ray information from the second receiver, the second controller being included in the detection controller and different from the first controller, and transmitting, by a transmitter, the first gamma-ray information, the second gamma-ray information, or a signal indicating the failure to the information analysis device, the transmitter being included in the detection controller.

According to an embodiment, the first gamma-ray information and the second gamma-ray information may respectively include an intensity of one of the first gamma ray and the second gamma ray, a wavelength of one of the first gamma ray and the second gamma ray, or any combination thereof.

According to an embodiment, the composition analysis method may further include detecting, by a third detection sensor, gamma rays emitted from the target object, transmitting, by the third detection sensor, third gamma-ray information about a gamma ray spectrum detected by the third detection sensor to the detection controller, transmitting, by the detection controller, the third gamma-ray information to the information analysis device when the detection controller does not identify that the first gamma-ray information has been transmitted from the first detection sensor to the detection controller, the detection controller does not identify that the second gamma-ray information has been transmitted from the second detection sensor to the detection controller, and the detection controller identifies that the third gamma-ray information has been transmitted from the third detection sensor to the detection controller, and analyzing, by the information analysis device, a component of the target object, a content of the target object, or any combination thereof based on the third gamma-ray information.

As discussed, the method and system suitably include use of a controller or processer.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
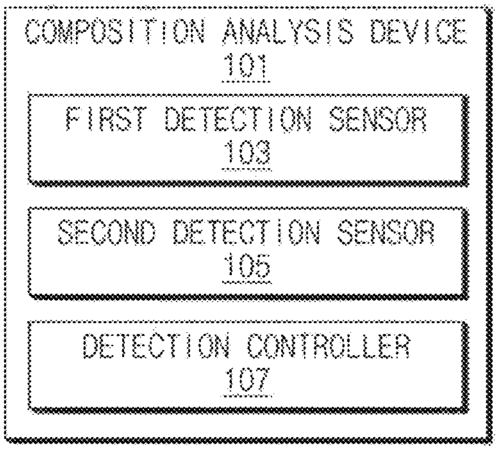
FIG. 1 is a block diagram illustrating the configuration of a composition analysis device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. These terms are merely intended to distinguish one component from another component, and the terms do not limit the nature, sequence or order of the constituent components. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In addition, in the present disclosure, the expressions "greater than" or "less than" may be used to indicate whether a specific condition is satisfied or fulfilled, but are used only to indicate examples, and do not exclude "greater than or equal to" or "less than or equal to". A condition indicating "greater than or equal to" may be replaced with "greater than", a condition indicating "less than or equal to" may be replaced with "less than", a condition indicating "greater than or equal to and less than" may be replaced with "greater than and less than or equal to". In addition, hereinafter, "A" to "B" means at least one of elements from A to (including A) and B (including B).

Hereinafter, embodiments of the present disclosure will be described in detail with reference to FIGS. 1 to 7.

FIG. 1 is a block diagram illustrating the configuration of a composition analysis device according to an embodiment of the present disclosure.

Referring to FIG. 1, a composition analysis device 101 may include a first detection sensor 103, a second detection sensor 105, and a detection controller 107. At least one of the first detection sensor 103, the second detection sensor 105, or the detection controller 107, or any combination thereof, may be electrically and/or operatively coupled with each other by an electronic component, such as a communication bus.

According to an embodiment, hereinafter, combining pieces of hardware operatively may mean a direct connection or an indirect connection between the pieces of hardware being established in a wired or wireless manner such that first hardware of the pieces of hardware is controlled by second hardware of the pieces of hardware. The type and/or number of hardware components included in the composition analysis device 101 are not limited to those shown in FIG. 1. For example, the composition analysis device 101 may include only some of the hardware components illustrated in FIG. 1.

According to an embodiment, to determine the composition and content of a raw material, the composition analysis device 101 may perform neutron irradiation on a target object. According to an embodiment, the target object may include a raw material for generating a commodity (e.g., iron ore, iron scrap, limestone), but embodiments of the present disclosure may not be limited thereto.

According to an embodiment, gamma rays may be emitted from the target object due to collisions of irradiated neutrons with molecules constituting the target object. Because the wavelength and intensity of the emitted gamma rays vary depending on the composition (e.g., Fe, $SiO_2$) and content of the target object, the composition analysis device 101 may analyze the emitted gamma rays to determine the composition and content of the target object.

According to an embodiment, the composition analysis device 101 may detect gamma rays emitted by the target object through a plurality of detection sensors (e.g., the first detection sensor 103 and the second detection sensor 105).

According to an embodiment, the composition analysis device 101 may transmit first gamma-ray information about a gamma ray spectrum detected by the first detection sensor 103 to the detection controller 107 via a first signal transmission line. The composition analysis device 101 may transmit second gamma-ray information about a gamma ray spectrum detected by the second detection sensor 105 to the detection controller 107 via a second signal transmission line that is different from the first signal transmission line.

According to an embodiment, the first signal transmission line and the second signal transmission line may be contained within the same cable, but embodiments of the present disclosure may not be limited thereto. According to another embodiment, a cable containing the first signal transmission line may be different from and a cable containing the second signal transmission line.

According to an embodiment, the cable containing the first signal transmission line and the second signal transmission line may be a shielding cable, but embodiments of the present disclosure may not be limited thereto. The shielding cable may include a cable core carrying information, and a shielding layer surrounding the cable core to reduce noise introduced from outside the shielding cable. The shielding layer may be grounded to reduce noise introduced into the signal transmitted by the cable core from the outside. The shielding layer may be a thin film made of a conductive material. According to another embodiment, the cable containing the first signal transmission line and the second signal transmission line may be a general cable rather than a shielding cable.

According to an embodiment, the composition analysis device 101 may determine, via the detection controller 107, whether the first gamma-ray information has been transmitted from the first detection sensor 103 to the detection controller 107, and whether the second gamma-ray information has been transmitted from the second detection sensor 105 to the detection controller 107.

According to an embodiment, the composition analysis device 101 may convert the first gamma-ray information, which is an analog signal, to a digital signal through the detection controller 107 based on determining that the first gamma-ray information has been transmitted to the detection controller 107. For example, the composition analysis device 101 may smooth the analog signal input via the detection controller 107 and then convert the analog signal to a digital signal. In other words, the composition analysis device 101 may convert the smoothed first gamma-ray information into a binary number that is a digital signal. According to an embodiment, the composition analysis device 101 may transmit the first gamma-ray information, which has been converted to a digital signal, to an information analysis device.

According to an embodiment, the composition analysis device 101 may transmit the second gamma-ray information, which has been converted to a digital signal, to the information analysis device based on determining that the first gamma-ray information has not been transmitted to the detection controller 107 and the second gamma-ray information has been transmitted to the detection controller 107. In other words, the detection controller 107 may transmit the second gamma-ray information, which has been processed in the same manner as the first gamma-ray information is processed, to the information analysis device. For example, the detection controller 107 may convert the smoothed second gamma-ray information into a binary number that is a digital signal.

According to an embodiment, the composition analysis device 101 may transmit the first gamma-ray information, which has been converted to a digital signal, rather than the second gamma-ray information, which has been converted to a digital signal, to the information analysis device based on determining that the first gamma-ray information has been transmitted from the first detection sensor 103 to the detection controller 107, and that the second gamma-ray information has been transmitted from the second detection sensor 105 to the detection controller 107. The composition analysis device 101 may transmit the first gamma-ray information, acquired through the first detection sensor 103 and converted to a digital signal, to the information analysis device unless an error or failure occurs in the process of receiving and converting the first gamma-ray information.

According to an embodiment, the composition analysis device 101 may transmit a signal indicating a failure of the composition analysis device 101 to the information analysis device based on determining that the first gamma-ray information has not been transmitted from the first detection sensor 103 to the detection controller 107, and that the second gamma-ray information has not been transmitted from the second detection sensor 105 to the detection controller 107. The failure of the composition analysis device 101 may include an error or a failure of the first detection sensor 103, a signal transmission line connecting the first detection sensor 103 to the detection controller 107, a portion of the detection controller 107 that processes the first gamma-ray information, the second detection sensor 105, a signal transmission line connecting the second detection sensor 105 to the detection controller 107, or a portion of the detection controller 107 that processes the second gamma-ray information.

According to an embodiment, the composition analysis device 101 may analyze at least one of a composition or a content of a target object or any combination thereof based on the first gamma-ray information or the second gamma-ray information, which has been converted through the information analysis device. The information analysis device may include a computer on which a program for analysis is stored or executed.

According to an embodiment, the information analysis device may provide a user with at least one of the compositions of the analyzed target object, or the contents of the analyzed target object, or any combination thereof, or provide the user with a notification indicating a failure of the composition analysis device.

Because conventional composition analysis devices do not include the second detection sensor 105 in addition to the first detection sensor 103, gamma-ray information may not be transmitted to the information analysis device when an error or failure occurs in a gamma ray detection circuit or a control module. Therefore, when an error or a failure occurs in the gamma ray detection circuit or the control module, the conventional composition analysis devices need to be shut down until the error or failure is resolved, resulting in a loss of productivity.

The composition analysis device 101 according to an embodiment may analyze the compositions and the contents of the target object through the second gamma-ray information acquired through the second detection sensor 105, which is not subject to an error or a failure, without irradiating the target object with neutrons again, when an error or a failure occurs in the first detection sensor 103, the signal transmission line connecting the first detection sensor 103 and the detection controller 107, or the portion of the detection controller 107 that processes the first gamma-ray information and the first gamma-ray information is not acquired.

Compared to a conventional composition analysis device, the composition analysis device 101 according to an embodiment may maintain operation even when an error or a failure occurs, thereby improving productivity and ensuring operational stability.

The composition analysis device 101 according to an embodiment may be used in a sensing device for a cement manufacturing process line or a main process line of a steel mill.

The composition analysis device 101 according to an embodiment may perform composition analysis on a large amount of target object compared to a conventional composition analysis device because the composition analysis device 101 is able to quickly identify the composition and content of the target object, and the time required to analyze the composition and content of the target object is short.

Therefore, when composition analysis is performed using the composition analysis device 101 according to an embodiment, a target object conveying line (e.g., an iron ore conveying line) may be expanded compared to when composition analysis is performed using a conventional composition analysis device. In other words, a larger amount of target object may be analyzed for composition through the composition analysis device compared to the conventional composition analysis device, and therefore the number of conveying lines, or the width of the conveying lines through which a target material is transported for composition analysis, may be increased.

Figure 2:
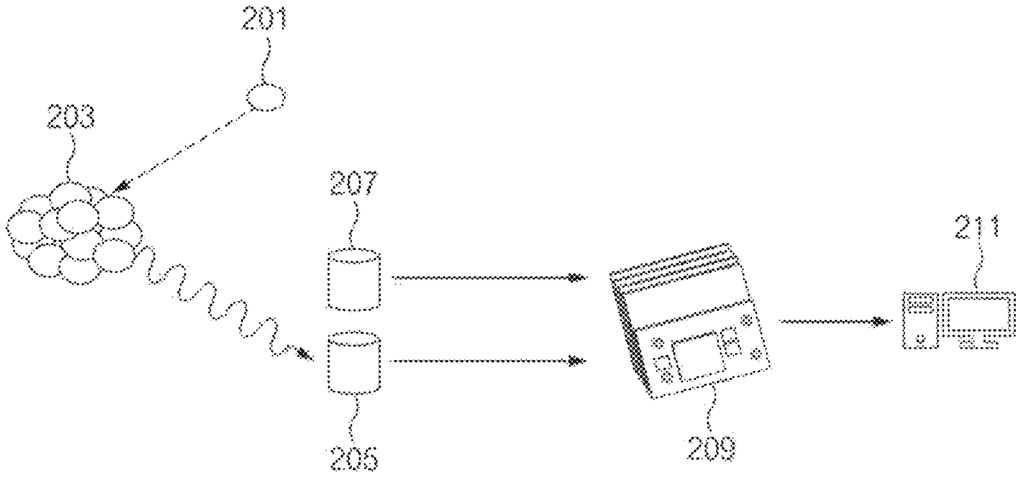
FIG. 2 illustrates an example of some components of a composition analysis device for analyzing a target object, in a composition analysis device or a composition analysis method according to an embodiment of the present disclosure.

FIG. 2 illustrates an example of some components of a composition analysis device for analyzing a target object, in a composition analysis device or a composition analysis method according to an embodiment of the present disclosure.

Referring to FIG. 2, the composition analysis device may irradiate a target object 203 with neutrons 201. A first detection sensor 205, and a second detection sensor 207 may detect gamma rays emitted from the target object 203 in response to the irradiated neutrons 201. A detection controller 209 may convert gamma-ray information received from the first detection sensor 205 or the second detection sensor 207 into a digital signal, and transmit the gamma-ray information to an information analysis device 211. Based on the converted gamma-ray information, the information analysis device 211 may analyze the composition and content of the target object and provide the composition and content of the target object to a user.

According to an embodiment, as a result of the collision of the neutrons 201 with the molecules constituting the target object 203, the target object 203 may emit gamma rays having a unique wavelength and intensity depending on the compositions and content of the target object 203.

According to an embodiment, the composition analysis device may acquire first gamma-ray information, which is gamma rays emitted from the target object 203, via the first detection sensor 205, and second gamma-ray information, which is gamma rays emitted from the target object 203, via the second detection sensor 207.

According to an embodiment, the composition analysis device may transmit the first gamma-ray information to the detection controller 209 in parallel via a first signal transmission line and the second gamma-ray information via a second signal transmission line that is different from the first signal transmission line. The first signal transmission line and the second signal transmission line may be included in the same cable, and the cable may be referred to as a cable composed of dual terminals, but embodiments of the present disclosure may not be limited thereto.

According to an embodiment, the composition analysis device may transmit the converted first gamma-ray information to the information analysis device 211 when it is identified that the first gamma-ray information has been transmitted to the detection controller 209.

According to an embodiment, the composition analysis device may transmit the converted second gamma-ray information to the information analysis device 211 when it is not identified that the first gamma-ray information has been transmitted to the detection controller 209 and it is identified that the second gamma-ray information has been transmitted to the detection controller 209.

According to an embodiment, when it is not identified that the first gamma-ray information has been transmitted to the detection controller 209 and it is not identified that the second gamma-ray information has been transmitted to the detection controller 209, the composition analysis device may transmit a signal indicative of a failure or an error, to the information analysis device 211.

According to an embodiment, the converted first gamma-ray information may be transmitted from the detection controller 209 to the information analysis device 211 via a first optical fiber, and the converted second gamma-ray information may be transmitted from the detection controller 209 to the information analysis device 211 via a second optical fiber different from the first optical fiber, but embodiments of the present disclosure may not be limited thereto. The first optical fiber and the second optical fiber may be included in a dual-optical fiber cable, but embodiments of the present disclosure may not be limited thereto.

According to another embodiment, the converted first gamma-ray information and the converted second gamma-ray information may be transmitted from the detection controller 209 to the information analysis device 211 via the same signal transmission line, but embodiments of the present disclosure may not be limited thereto.

According to an embodiment, when receiving the converted first gamma-ray information or the converted second gamma-ray information, the information analysis device 211 may analyze the composition and content of the target object 203, and provide the user with information indicating the composition and content of the target object 203 through a display.

According to an embodiment, when receiving a signal indicating a failure, the information analysis device 211 may provide the user with a notification indicating a failure of the composition analysis device via the display.

Although it is described in FIG. 2 that the number of the detection sensors constituting the composition analysis device is two, but embodiments of the present disclosure may not be limited thereto. According to one embodiment, detection sensors constituting a composition analysis device may include a plurality of detection sensors. For example, the composition analysis device may additionally include a third detection sensor for identifying gamma rays. The composition analysis device may detect gamma rays emitted from the target object 203 through the third detection sensor and transmit third gamma-ray information about a gamma ray spectrum detected by the third detection sensor to the detection controller 209. The composition analysis device may transmit the third gamma-ray information, converted into a digital signal through the detection controller 209, to the information analysis device 211. When it is not identified that the first gamma-ray information has been transmitted from the first detection sensor to the detection controller 209, it is not identified that the second gamma-ray information has been transmitted from the second detection sensor to the detection controller 209, and it is identified that the third gamma-ray information is transmitted from the third detection sensor to the detection controller 209, through the detection controller 209, the composition analysis device may transmit the third gamma-ray information which has been converted into a digital signal, to the information analysis device 211 via the detection controller 209. The composition analysis device may analyze at least one of the compositions of the target object, or content of the target object, or any combination thereof based on the converted third gamma-ray information through the information analysis device 211.

Figure 3:
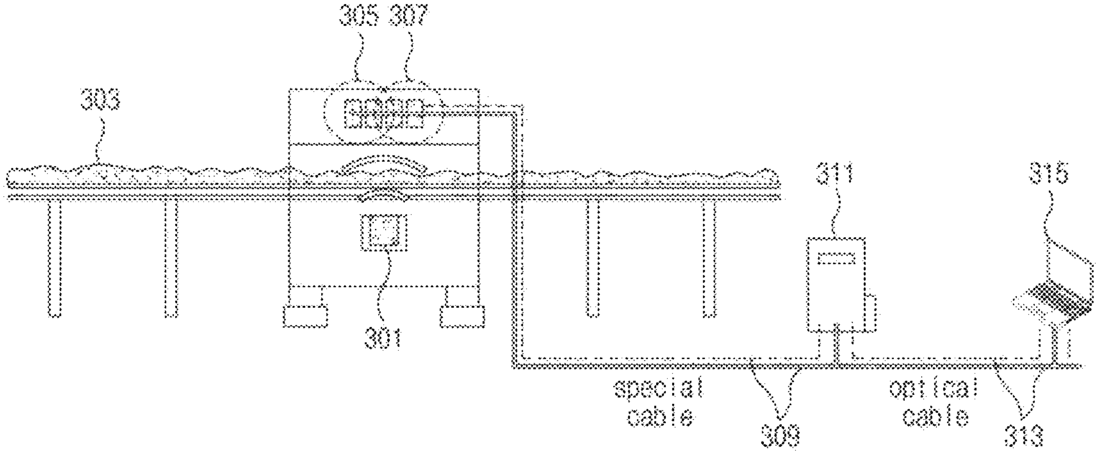
FIG. 3 illustrates an example of a composition analysis device in a composition analysis device or a composition analysis method according to an embodiment of the present disclosure.

FIG. 3 illustrates an example of a composition analysis device in a composition analysis device or a composition analysis method according to an embodiment of the present disclosure. The composition analysis device may include a cross-belt type detection sensor and a detection controller redundant circuit.

Referring to FIG. 3, according to an embodiment, the compositions and content of a target object 303 may be analyzed by a composition analysis device. The target object 303 may be placed on a conveying line. As the line moves, the target object 303 may move into the composition analysis device.

According to an embodiment, neutrons may be generated by a reaction between deuterium and deuterium in a neutron generator 301. The neutron generator 301 may irradiate neutrons to the target object 303.

According to an embodiment, a first detection sensor 305 and a second detection sensor 307 may detect gamma rays emitted from the target object 303.

According to an embodiment, a first cable 309 may transmit first gamma-ray information and second gamma-ray information acquired from the first detection sensor 305 and the second detection sensor 307 to a detection controller 311. A first signal transmission line in the first cable 309 may transmit the first gamma-ray information acquired from the first detection sensor 305, and a second signal transmission line in the first cable 309 may transmit the second gamma-ray information acquired from the second detection sensor 307. The first signal transmission line may be different from the second signal transmission line. The detection controller 311 may include dual terminals. The first cable 309 may be a shielding conductor.

According to an embodiment, the detection controller 311 may convert gamma-ray information, which is an analog signal, into a digital signal and transmit the gamma-ray information to an information analysis device 315.

According to an embodiment, a second cable 313 may transmit a signal generated from the detection controller 311 to the information analysis device 315. A fourth signal transmission line in the second cable 313 may transmit the converted first gamma-ray information, and a fifth signal transmission line in the second cable 313 may transmit the converted second gamma-ray information. The fourth signal transmission line may be different from the fifth signal transmission line. According to an embodiment, the second cable 313 may be a shielding line. According to another embodiment, the second cable 313 may be a dual optical fiber cable.

According to an embodiment, the information analysis device 315 may analyze the component and content of the target object 303 by analyzing the converted gamma-ray information and provide the component and content of the target object 303 to a user. According to an embodiment, when a signal indicating a failure is received, the information analysis device 315 may provide a notification indicating the failure to the user.

Figure 4:
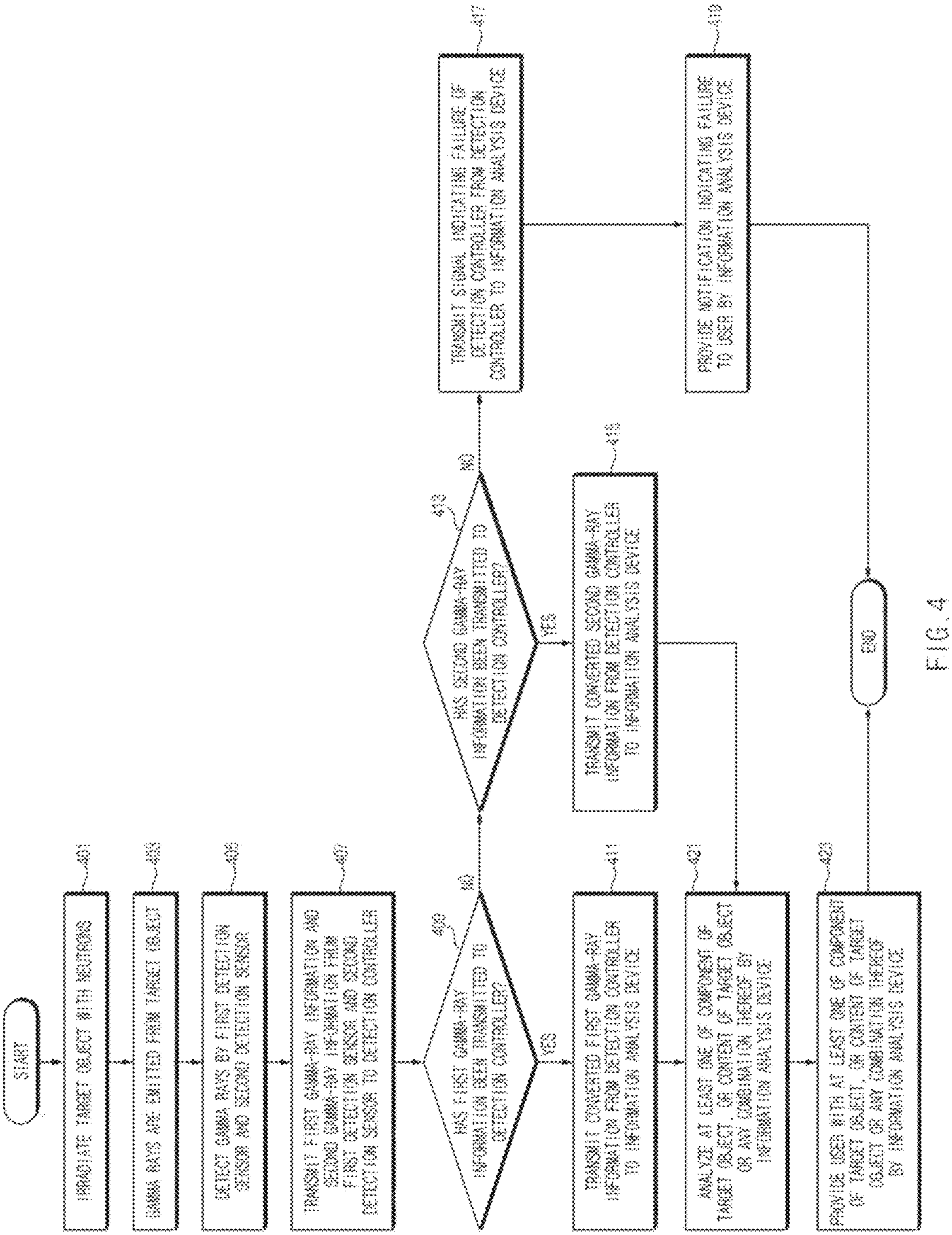
FIG. 4 shows a flow chart of operation for analyzing components of a target object in a composition analysis device or a composition analysis method according to an embodiment of the present disclosure.

FIG. 4 shows a flow chart of operation for analyzing components of a target object in a composition analysis device or a composition analysis method according to an embodiment of the present disclosure.

Hereinafter, it is assumed that the composition analysis device 101 of FIG. 1 performs the process of FIG. 4. Additionally, in the description of FIG. 4, operations described as being performed by the composition analysis device may be understood as being controlled by the composition analysis device 101.

In a first operation 401, the composition analysis device may irradiate a target object with neutrons.

According to an embodiment, the composition analysis device may use a belt conveyor to transport raw material (e.g., iron ore) imported from overseas, which is a target object, to a neutron generator. The neutron generator may generate neutrons by reacting deuterium with deuterium. The generated neutrons may be irradiated to the target object that is the raw material.

In a second operation 403, the composition analysis device may identify that gamma rays are emitted from the target object.

According to an embodiment, in response to neutrons being irradiated to the raw material that is the target object, unique gamma rays may be emitted from the raw material that is the target object.

In a third operation 405, a first detection sensor and a second detection sensor of the composition analysis device may detect gamma rays.

According to an embodiment, the composition analysis device may detect unique gamma rays emitted from the raw material that is the target object through the first detection sensor and the second detection sensor.

In a fourth operation 407, the first detection sensor and the second detection sensor of the composition analysis device may transmit first gamma-ray information and second gamma-ray information to a detection controller.

According to an embodiment, the first detection sensor and the second detection sensor may transmit the first gamma-ray information and the second gamma-ray information to the input terminal of the detection controller.

In a fifth operation 409, the detection controller of the composition analysis device may identify whether the first gamma-ray information has been transmitted to the detection controller. When the first gamma-ray information has been transmitted to the detection controller, the composition analysis device may perform a sixth operation 411. When the first gamma-ray information has not been transmitted to the detection controller, the composition analysis device may perform a seventh operation 413.

When the first gamma-ray information has not been transmitted to the detection controller in the composition analysis device without a detection controller composed of a parallel circuit, the composition analysis device without the detection controller composed of a parallel circuit may perform a ninth operation 417 without considering whether to perform a seventh operation 413 and an eighth operation 415.

According to an embodiment, the composition analysis device may receive the first gamma-ray information from a first receiver among the input terminals of the detection controller and then transmit the first gamma-ray information to a first controller.

In the sixth operation 411, the detection controller of the composition analysis device may transmit the converted first gamma-ray information to an information analysis device.

According to an embodiment, the composition analysis device may transmit the converted first gamma-ray information to the information analysis device based on the first controller receiving the first gamma-ray information from among the input terminals of the detection controller.

In the seventh operation 413, the detection controller of the composition analysis device may identify whether the second gamma-ray information has been transmitted to the detection controller. When the second gamma-ray information is transmitted to the detection controller, the composition analysis device may perform the eighth operation 415. When the second gamma-ray information has not been transmitted to the detection controller, the composition analysis device may perform the ninth operation 417.

According to an embodiment, the premise for identifying whether the second gamma-ray information has been transmitted to the detection controller may be that the first controller has not received the first gamma-ray information. Based on the fact that the first gamma-ray information has not been received, the first controller may transmit a signal indicating the information that the first gamma-ray information has not been received to a second controller. The second controller may identify whether the second gamma-ray information has been transmitted to the detection controller based on the signal received.

In the eighth operation 415, the detection controller of the composition analysis device may transmit the converted second gamma-ray information to the information analysis device.

According to an embodiment, as a premise for the composition analysis device to transmit the second gamma-ray information to the information analysis device, the second controller may need to identify that the second gamma-ray information has been transmitted to the detection controller. A second receiver of the input terminals of the detection controller may receive the second gamma-ray information and then transmit the second gamma-ray information to the second controller. The second controller may convert the second gamma-ray information and transmit the second gamma-ray information to the information analysis device.

In the ninth operation 417, the detection controller of the composition analysis device may transmit a signal indicating a failure to the information analysis device.

In a tenth operation 419, the information analysis device of the composition analysis device may provide a notification indicating a failure to the user.

According to an embodiment, a notification indicating a failure may be displayed through a monitor included in the information analysis device.

In an eleventh operation 421, the information analysis device of the composition analysis device may analyze at least one of the components of the target object, or content of the target object, or any combination thereof.

In a twelfth operation 423, the information analysis device of the composition analysis device may provide at least one of the components of the target object, or content of the target object, or any combination thereof to the user.

According to an embodiment, the components or content may be displayed through the monitor included in the information analysis device.

Figure 5:
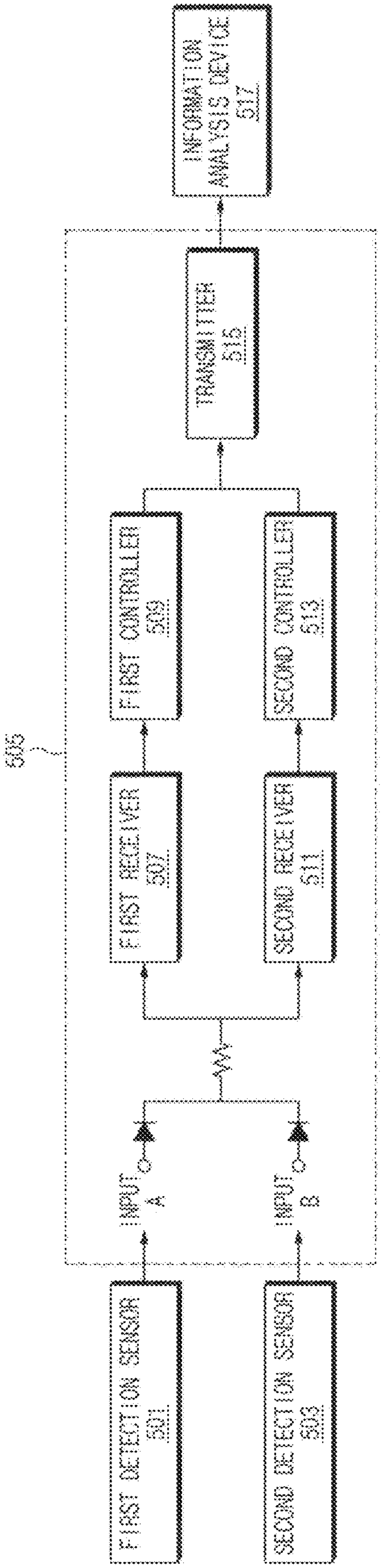
FIG. 5 illustrates an example of configuration of a composition analysis device in the composition analysis device or a composition analysis method according to an embodiment of the present disclosure.

FIG. 5 illustrates an example of configuration of a composition analysis device in the composition analysis device or a composition analysis method according to an embodiment of the present disclosure.

Referring to FIG. 5, a first detection sensor 501 according to an embodiment may transmit first gamma-ray information, which is information about the intensity and wavelength of gamma rays emitted from a target object, to a detection controller 505. A second detection sensor 503 may transmit second gamma-ray information, which is information about the intensity and wavelength of the gamma rays emitted from the target object, to the detection controller 505.

According to an embodiment, the detection controller 505 may include a first receiver 507, a first controller 509, a second receiver 511, a second controller 513, and a transmitter 515.

According to an embodiment, the first receiver 507 may receive first gamma-ray information from the first detection sensor 501 and smooth the first gamma-ray information, which is an analog signal. The first receiver 507 may transmit the smoothed first gamma-ray information to the first controller 509. The first controller 509 may receive the smoothed first gamma-ray information from the first receiver 507, convert the smoothed first gamma-ray information into a digital signal, and then transmit the digital signal to the transmitter 515.

According to an embodiment, the second receiver 511 and the second controller 513 may process the second gamma-ray information in parallel in the manner in which the first receiver 507 and the first controller 509 process the first gamma-ray information. In other words, the second receiver 511 may receive the second gamma-ray information, smooth the second gamma-ray information, and then transmit the smoothed second gamma-ray information to the second controller 513. The second controller 513 may convert the smoothed second gamma-ray information into a digital signal and then transmit the digital signal to the transmitter 515.

According to an embodiment, when the first gamma-ray information is received, the transmitter 515 may transmit the converted first gamma-ray information to an information analysis device 517. When the first gamma-ray information is not received and the second gamma-ray information is rather received, the transmitter 515 may transmit the converted second gamma-ray information to the information analysis device 517. When neither the first gamma-ray information nor the second gamma-ray information is received, the transmitter 515 may transmit a signal indicating a failure to the information analysis device 517.

According to an embodiment, the information analysis device 517 may analyze the components and content of the target object based on the acquired gamma-ray information and then provide the components and content of the target object to the user through a display. The information analysis device 517 may provide a notification indicating a failure to the user through a display based on receiving the signal indicating the failure.

According to an embodiment, a parallel circuit control board or an input/output circuit may be manufactured in duplicate to connect the first receiver 507, the first controller 509, the second receiver 511, and the second controller 513 to the transmitter 515 in parallel.

Figure 6:
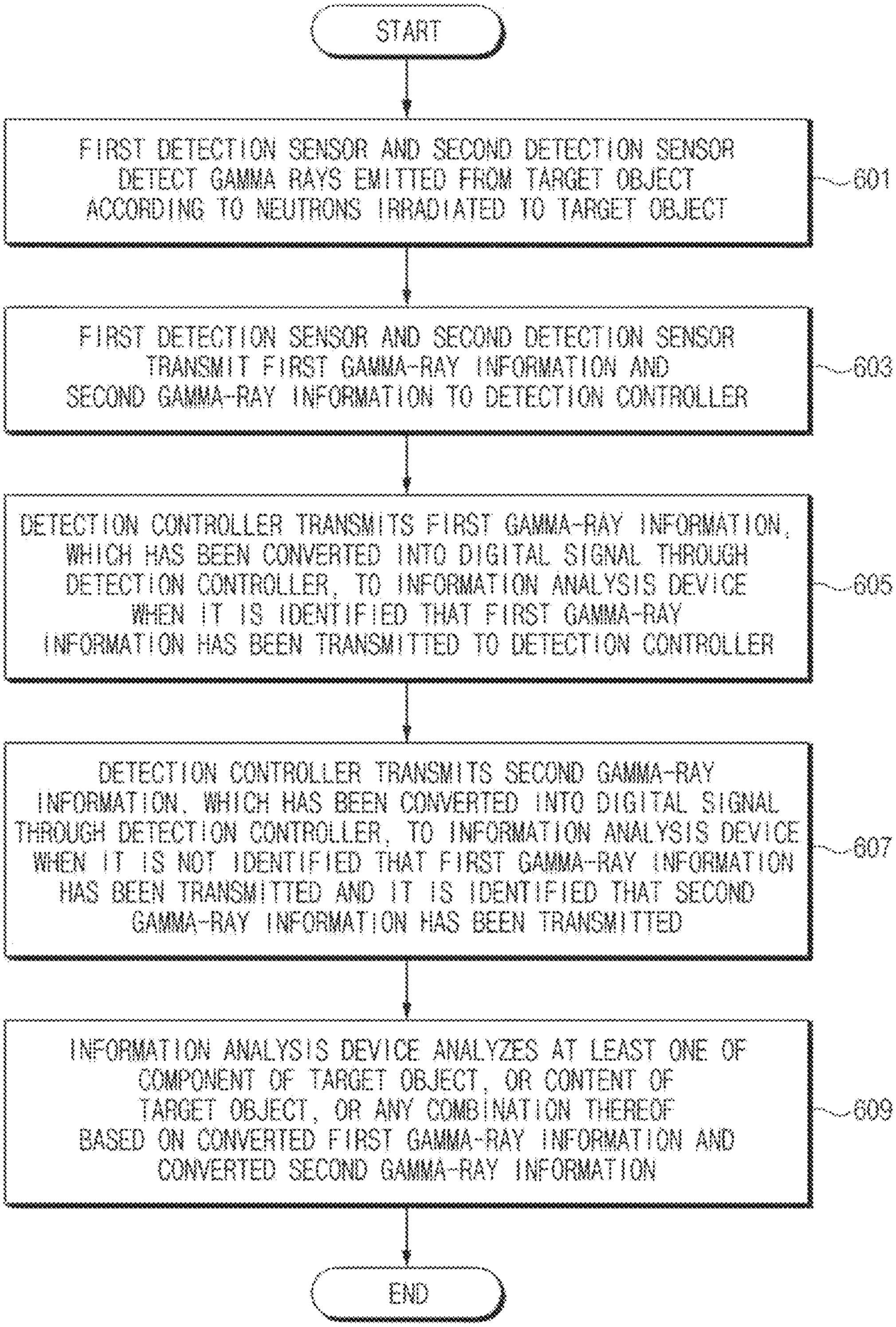
FIG. 6 illustrates a flow chart of operation for analyzing a component or a content of a target object through a detection controller in a composition analysis device or a composition analysis method according to an embodiment of the present disclosure.

FIG. 6 illustrates a flow chart of operation for analyzing a component or a content of a target object through a detection controller in a composition analysis device or a composition analysis method according to an embodiment of the present disclosure.

Hereinafter, it is assumed that the composition analysis device 101 of FIG. 1 performs the process of FIG. 6. Additionally, in the description of FIG. 6, operations described as being performed by the composition analysis device may be understood as being controlled by the composition analysis device 101.

In a first operation 601, a first detection sensor and a second detection sensor may detect gamma rays emitted from a target object according to neutrons irradiated to the target object.

In a second operation 603, the first detection sensor and the second detection sensor may transmit first gamma-ray information and second gamma-ray information to a detection controller. The first gamma-ray information may include information about a gamma ray spectrum detected by the first detection sensor. The second gamma-ray information may include information about a gamma ray spectrum detected by the second detection sensor.

In a third operation 605, when it is identified that the first gamma-ray information has been transmitted to the detection controller, the detection controller may transmit the first gamma-ray information which has been converted into a digital signal through the detection controller, to an information analysis device.

In a fourth operation 607, when it is not identified that the first gamma-ray information has been transmitted and it is identified that the second gamma-ray information has been transmitted, the detection controller may transmit the second gamma-ray information, which has been converted into a digital signal through the detection controller, to the information analysis device.

In a fifth operation 609, the information analysis device may analyze at least one of the component of the target object, or content of the target object, or any combination thereof, based on the converted first gamma-ray information or the converted second gamma-ray information.

Figure 7:
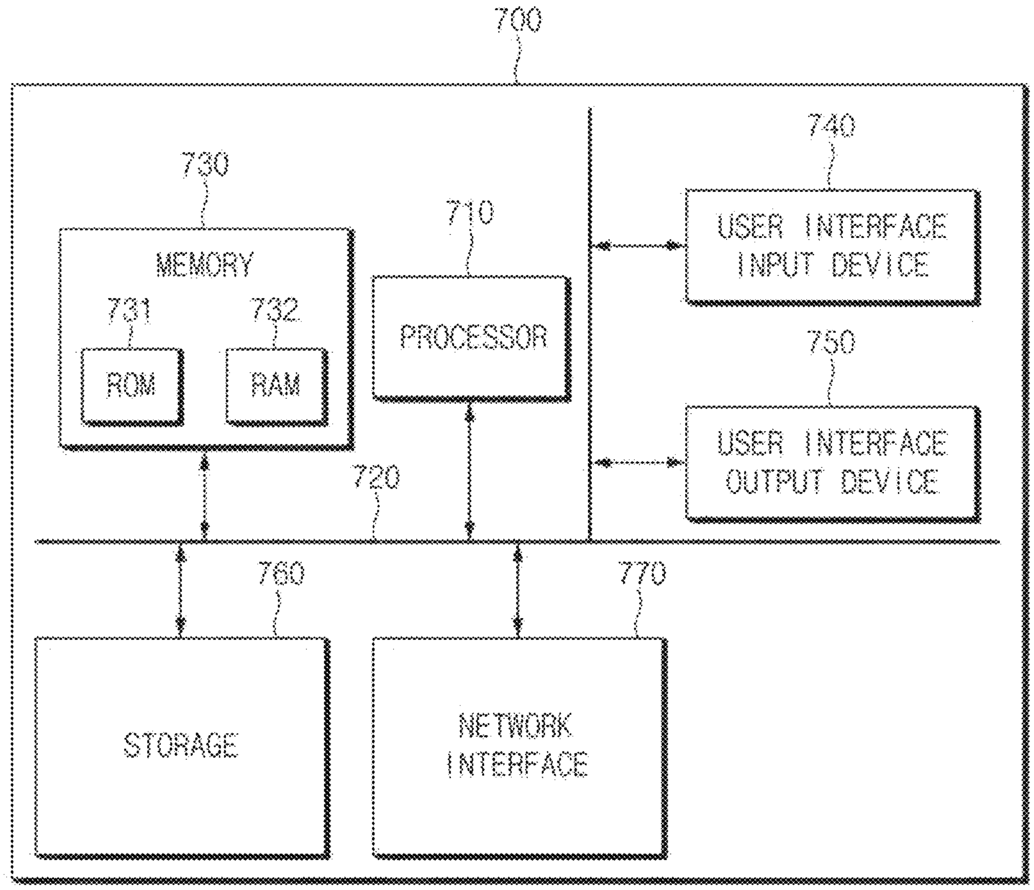
FIG. 7 illustrates a computing system related to a composition analysis device or a composition analysis method according to an embodiment of the present disclosure.

FIG. 7 illustrates a computing system related to a composition analysis device or a composition analysis method according to an embodiment of the present disclosure.

Referring to FIG. 7, a computing system 700 may include at least one processor 710, a memory 730, a user interface input device 740, a user interface output device 750, storage 760, and a network interface 770, which are connected with each other via a bus 720.

The processor 710 may be a central processing unit (CPU) or a semiconductor device that processes instructions stored in the memory 730 and/or the storage 760. The memory 730 and the storage 760 may include various types of volatile or non-volatile storage media. For example, the memory 730 may include a ROM (Read Only Memory) 731 and a RAM (Random Access Memory) 732.

Thus, the operations of the method or the algorithm described in connection with the embodiments disclosed herein may be embodied directly in hardware or a software module executed by the processor 710, or in a combination thereof. The software module may reside on a storage medium (that is, the memory 730 and/or the storage 760) such as a RAM, a flash memory, a ROM, an EPROM, an EEPROM, a register, a hard disk, a removable disk, and a CD-ROM.

The exemplary storage medium may be coupled to the processor 710, and the processor 710 may read information out of the storage medium and may record information in the storage medium. Alternatively, the storage medium may be integrated with the processor 710. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The present technology may ensure operational stability by detecting gamma rays through a plurality of detection sensors connected in parallel.

Further, the present technology may ensure operational stability when some of components for detecting gamma rays fail.

Further, the present technology may improve the convenience of device maintenance by notifying the user of the failure of some of the components for detecting gamma rays when some of the components for detecting gamma rays fail.

Further, the present technology may continuously perform composition analysis through other detection results, by obtaining a plurality of detection results from a plurality of detection sensors connected in parallel, even when some of the plurality of detection results is not obtained.

Further, the present technology may prevent production loss due to a failure of equipment.

Further, the present technology may prevent secondary equipment accidents, human accidents, or safety accidents caused by primary equipment failure.

Further, the present technology may reduce anxiety caused by factory shutdowns by ensuring operational stability.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A composition analysis device comprising:

a first detection sensor configured to identify gamma rays;

a second detection sensor configured to identify the gamma rays; and a detection controller, wherein the first detection sensor and the second detection sensor are configured to:

detect gamma rays emitted by a target object from irradiation of neutrons to the target object; and transmit, to the detection controller, first gamma-ray information about a gamma ray spectrum detected by the first detection sensor and second gamma-ray information about a gamma ray spectrum detected by the second detection sensor respectively, wherein the detection controller is configured to:

transmit the first gamma-ray information to an information analysis device when the detection controller identifies that the first gamma-ray information has been transmitted from the first detection sensor to the detection controller; and transmit the second gamma-ray information to the information analysis device when the detection controller does not identify that the first gamma-ray information has been transmitted from the first detection sensor to the detection controller and the detection controller identifies that the second gamma-ray information has been transmitted from the second detection sensor to the detection controller, and wherein the information analysis device is configured to analyze a component of the target object, a content of the target object, or any combination thereof based on the first gamma-ray information or the second gamma-ray information.

2. The composition analysis device of claim 1, wherein the detection controller is configured to transmit a signal indicating a failure of the composition analysis device, to the information analysis device when the detection controller does not identify that the first gamma-ray information has been transmitted from the first detection sensor to the detection controller and the detection controller does not identify that the second gamma-ray information has been transmitted from the second detection sensor to the detection controller.

3. The composition analysis device of claim 2, wherein the information analysis device is configured to:

provide the component of the analyzed target object, the content of the analyzed target object, or any combination thereof to a user when the first gamma-ray information or the second gamma-ray information is received; and provide a notification indicating the failure of the composition analysis device to the user when a signal indicating the failure is received.

4. The composition analysis device of claim 2, wherein the detection controller comprises a first receiver configured to receive the first gamma-ray information;

a first controller configured to receive the first gamma-ray information from the first receiver;

a second receiver configured to receive the second gamma-ray information, the second receiver being different from the first receiver;

a second controller configured to receive the second gamma-ray information from the second receiver, the second controller being different from the first controller; and a transmitter configured to transmit the first gamma-ray information, the second gamma-ray information, or a signal indicating the failure to the information analysis device.

5. The composition analysis device of claim 1, wherein the detection controller is configured to transmit the first gamma-ray information, not the second gamma-ray information, to the information analysis device when the detection controller identifies that the first gamma-ray information is transmitted from the first detection sensor to the detection controller, and that the second gamma-ray information is transmitted from the second detection sensor to the detection controller.

6. The composition analysis device of claim 1, wherein the first gamma-ray information is transmitted to the detection controller from the first detection sensor via a first signal transmission line and converted into a digital signal through the detection controller, and wherein the second gamma-ray information is transmitted to the detection controller from the second detection sensor via a second signal transmission line different from the first signal transmission line and converted into a digital signal through the detection controller.

7. The composition analysis device of claim 1, wherein the first gamma-ray information and the second gamma-ray information are transmitted from the first detection sensor and the second detection sensor to the detection controller via a shielding cable, wherein the shielding cable comprises:

a cable core configured to transmit the first gamma-ray information and the second gamma-ray information; and a shielding layer configured to surround the cable core to reduce noise caused from outside the shielding cable.

8. The composition analysis device of claim 1, wherein the first gamma-ray information is transmitted from the detection controller to the information analysis device via a first optical fiber, wherein the second gamma-ray information is transmitted from the detection controller to the information analysis device via a second optical fiber different from the first optical fiber, and wherein the first optical fiber and the second optical fiber are included in a dual-optical fiber cable.

9. The composition analysis device of claim 1, wherein the first gamma-ray information and the second gamma-ray information respectively comprise an intensity of one of the first gamma ray and the second gamma ray, a wavelength of one of the first gamma ray and the second gamma ray, or any combination thereof.

10. The composition analysis device of claim 1, further comprising:

a third detection sensor configured to identify the gamma rays, wherein the third detection sensor is configured to:

detect gamma rays emitted from the target object; and transmit third gamma-ray information about a gamma ray spectrum detected by the third detection sensor to the detection controller, wherein the detection controller is configured to transmit the third gamma-ray information to the information analysis device when the detection controller does not identify that the first gamma-ray information has been transmitted from the first detection sensor to the detection controller, the detection controller does not identify that the second gamma-ray information has been transmitted from the second detection sensor to the detection controller, and the detection controller identifies that the third gamma-ray information has been transmitted from the third detection sensor to the detection controller, and wherein the information analysis device is configured to analyze a component of the target object, a content of the target object, or any combination thereof based on the third gamma-ray information.

11. A composition analysis method comprising:

detecting, by a first detection sensor and a second detection sensor, gamma rays emitted from a target object from irradiation of neutrons to the target object;

transmitting, by the first detection sensor and the second detection sensor, to a detection controller, first gamma-ray information about a gamma ray spectrum detected by the first detection sensor and second gamma-ray information about a gamma ray spectrum detected by the second detection sensor respectively;

transmitting, by the detection controller, the first gamma-ray information to an information analysis device when the detection controller identifies that the first gamma-ray information has been transmitted from the first detection sensor to the detection controller;

transmitting, by the detection controller, the second gamma-ray information to the information analysis device when the detection controller does not identify that the first gamma-ray information has been transmitted from the first detection sensor to the detection controller and the detection controller identifies that the second gamma-ray information has been transmitted from the second detection sensor to the detection controller; and analyzing, by the information analysis device, a component of the target object, a content of the target object, or any combination thereof based on the first gamma-ray information or the second gamma-ray information.

12. The composition analysis method of claim 11, further comprising:

transmitting, by the detection controller, a signal indicating a failure of the composition analysis device, to the information analysis device when the detection controller does not identify that the first gamma-ray information has been transmitted from the first detection sensor to the detection controller and the detection controller does not identify that the second gamma-ray information has been transmitted from the second detection sensor to the detection controller.

13. The composition analysis method of claim 12, further comprising:

providing, by the information analysis device, the component of the analyzed target object, the content of the analyzed target object, or any combination thereof to a user when the converted first gamma-ray information or the converted second gamma-ray information is received; and providing, by the information analysis device, a notification indicating the failure of the composition analysis device to the user when the signal indicating the failure is received.

14. The composition analysis method of claim 12, further comprising:

receiving, by a first receiver, the first gamma-ray information, the first receiver being included in the detection controller;

receiving, by a first controller, the first gamma-ray information from the first receiver, the first controller being included in the detection controller;

receiving, by a second receiver, the second gamma-ray information, the second receiver being included in the detection controller and different from the first receiver;

receiving, by a second controller, the second gamma-ray information from the second receiver, the second controller being included in the detection controller and different from the first controller; and transmitting, by a transmitter, the converted first gamma-ray information, the converted second gamma-ray information, or a signal indicating the failure to the information analysis device, the transmitter being included in the detection controller.

15. The composition analysis method of claim 11, further comprising:

transmitting, by the detection controller, the converted first gamma-ray information, not the converted second gamma-ray information, to the information analysis device when the detection controller identifies that the first gamma-ray information is transmitted from the first detection sensor to the detection controller, and that the second gamma-ray information is transmitted from the second detection sensor to the detection controller.

16. The composition analysis method of claim 11, wherein the transmitting, by the first detection sensor and the second detection sensor, to the detection controller, the first gamma-ray information about the gamma ray spectrum detected by the first detection sensor and the second gamma-ray information about the gamma ray spectrum detected by the second detection sensor respectively comprises:

transmitting, by the first detection sensor, the first gamma-ray information from the first detection sensor to the detection controller via a first signal transmission line;

transmitting, by the second detection sensor, the second gamma-ray information from the second detection sensor to the detection controller via a second signal transmission line different from the first signal transmission line; and converting the first gamma-ray information and the second gamma-ray information into a digital signal respectively through the detection controller.

17. The composition analysis method of claim 11, wherein the transmitting, by the first detection sensor and the second detection sensor, to the detection controller, the first gamma-ray information about the gamma ray spectrum detected by the first detection sensor and the second gamma-ray information about the gamma ray spectrum detected by the second detection sensor respectively comprises:

transmitting the first gamma-ray information and the second gamma-ray information via a cable core included in a shielding cable; and reducing noise caused from outside the shielding cable via a shielding layer included in the shielding cable, the shielding layer surrounding the cable core.

18. The composition analysis method of claim 11, wherein the transmitting, by the detection controller, the second gamma-ray information to the information analysis device when the detection controller does not identify that the first gamma-ray information has been transmitted from the first detection sensor to the detection controller and the detection controller identifies that the second gamma-ray information has been transmitted from the second detection sensor to the detection controller comprises:

transmitting the converted first gamma-ray information from the detection controller to the information analysis device via a first optical fiber; and transmitting the converted second gamma-ray information from the detection controller to the information analysis device via a second optical fiber different from the first optical fiber, and wherein the first optical fiber and the second optical fiber are included in a dual-optical fiber cable.

19. The composition analysis method of claim 11, wherein the first gamma-ray information and the second gamma-ray information respectively comprise an intensity of one of the first gamma ray and the second gamma ray, a wavelength of one of the first gamma ray and the second gamma ray, or any combination thereof.

20. The composition analysis method of claim 11, further comprising:

detecting, by a third detection sensor, gamma rays emitted from the target object;

transmitting, by the third detection sensor, third gamma-ray information about a gamma ray spectrum detected by the third detection sensor to the detection controller;

transmitting, by the detection controller, the third gamma-ray information to the information analysis device when the detection controller does not identify that the first gamma-ray information has been transmitted from the first detection sensor to the detection controller, the detection controller does not identify that the second gamma-ray information has been transmitted from the second detection sensor to the detection controller, and the detection controller identifies that the third gamma-ray information has been transmitted from the third detection sensor to the detection controller; and analyzing, by the information analysis device, a component of the target object, a content of the target object, or any combination thereof based on the converted third gamma-ray information.

* * * * *